(12) United States Patent
Plesternings

(10) Patent No.: US 6,837,535 B2
(45) Date of Patent: Jan. 4, 2005

(54) CONVERTIBLE ROOF SYSTEM

(75) Inventor: Frank Plesternings, Hartland, MI (US)

(73) Assignee: ASC Incorporated, Southgate, MI (US)

( * ) Notice: Subject to any disclaimer, the term of this patent is extended or adjusted under 35 U.S.C. 154(b) by 39 days.

(21) Appl. No.: 10/628,763

(22) Filed: Jul. 28, 2003

(65) Prior Publication Data

US 2004/0032146 A1 Feb. 19, 2004

Related U.S. Application Data

(60) Provisional application No. 60/403,701, filed on Aug. 15, 2002.

(51) Int. Cl.[7] .................................................. B60J 7/14
(52) U.S. Cl. ................... 296/121; 296/108; 296/107.17
(58) Field of Search ................................ 296/108, 116, 296/117, 121, 107.17

(56) References Cited

U.S. PATENT DOCUMENTS

| | | |
|---|---|---|
| 2,935,350 A | 5/1960 | Bestrom |
| 4,415,189 A | 11/1983 | Kastelic, Jr. |
| 4,441,345 A | 4/1984 | Guarr |
| 4,466,644 A | 8/1984 | Wooten et al. |
| 4,523,785 A | 6/1985 | Draper et al. |
| 4,529,243 A | 7/1985 | Kaltz et al. |
| 4,537,440 A | 8/1985 | Brockway et al. |
| 4,540,215 A | 9/1985 | Swearingen |
| 4,600,233 A | 7/1986 | Boydston |
| 4,687,247 A | 8/1987 | Muscat |
| 4,712,828 A | 12/1987 | Albrecht |
| 4,723,812 A | 2/1988 | Masuda et al. |
| 4,783,113 A | 11/1988 | Padlo |
| 4,799,729 A | 1/1989 | Muscat |
| 4,801,173 A | 1/1989 | Trenkler |
| 4,815,775 A | 3/1989 | Mertin et al. |
| 4,819,983 A | 4/1989 | Alexander et al. |
| 4,830,425 A | 5/1989 | Muscat |
| 4,898,410 A | 2/1990 | Brin |
| 4,917,415 A | 4/1990 | Wurl |
| 5,035,463 A | 7/1991 | Kato et al. |
| 5,042,869 A | 8/1991 | Brin |
| 5,046,767 A | 9/1991 | Muscat |
| 5,052,740 A | 10/1991 | Bauer et al. |
| RE33,790 E | 1/1992 | Huber |
| 5,085,483 A | 2/1992 | Alexander |
| 5,154,479 A | 10/1992 | Sautter, Jr. |
| 5,186,516 A | 2/1993 | Alexander et al. |
| 5,269,586 A | 12/1993 | Hahn et al. |
| 5,284,378 A | 2/1994 | Sautter, Jr. |
| 5,301,987 A | 4/1994 | Tokarz et al. |

(List continued on next page.)

FOREIGN PATENT DOCUMENTS

| | | |
|---|---|---|
| DE | 44 15 969 A1 | 11/1995 |
| EP | 1 072 455 A2 | 1/2001 |
| EP | 1 072 456 A2 | 1/2001 |
| EP | 1 092 580 A1 | 4/2001 |
| WO | WO 02/064391 A1 | 8/2002 |

OTHER PUBLICATIONS

4–Pages of Photos of 2000 Model Year, Mercedes SLK Convertible Top Latch Mechanism.

European Search Report for EP 03 25 5028 dated Nov. 10, 2003, 2 pages.

Primary Examiner—Jason Morrow
(74) Attorney, Agent, or Firm—Harness, Dickey & Pierce, P.L.C.

(57) ABSTRACT

A hardtop convertible roof apparatus is provided. In another aspect of the present invention, rigid, hardtop front and/or rear roof sections are employed. A further aspect of the present invention provides a header latch assembly capable of conveniently and reliably latching the front roof section to a front header. In yet another aspect of the present invention, a panel-to-panel latch assembly is provided that selectively couples the front roof section to the rear roof section in response to the latching of the front roof section to the front header.

26 Claims, 12 Drawing Sheets

U.S. PATENT DOCUMENTS

| | | |
|---|---|---|
| 5,322,336 A | 6/1994 | Isler |
| 5,338,085 A | 8/1994 | Guckel et al. |
| 5,413,390 A | 5/1995 | Filippi |
| 5,429,400 A | 7/1995 | Kawaguchi et al. |
| 5,435,615 A | 7/1995 | Schmitz |
| 5,490,709 A | 2/1996 | Rahn |
| 5,582,454 A | 12/1996 | Grover |
| 5,595,407 A | 1/1997 | ter Horst et al. |
| 5,620,226 A | 4/1997 | Sautter, Jr. |
| 5,624,149 A | 4/1997 | Tokarz |
| 5,645,309 A | 7/1997 | Graf |
| 5,678,881 A | 10/1997 | Tokarz |
| 5,722,704 A | 3/1998 | Chaput et al. |
| 5,743,587 A | 4/1998 | Alexander et al. |
| 5,755,467 A | 5/1998 | Dilluvio et al. |
| 5,769,483 A | 6/1998 | Danzl et al. |
| 5,772,275 A | 6/1998 | Tokarz |
| 5,785,375 A | 7/1998 | Alexander et al. |
| 5,820,206 A | 10/1998 | Smith |
| 5,833,300 A | 11/1998 | Russke |
| 5,839,778 A | 11/1998 | Schaible et al. |
| 5,904,394 A | 5/1999 | Dilluvio et al. |
| 5,921,608 A | 7/1999 | Schmitt et al. |
| 5,944,375 A | 8/1999 | Schenk et al. |
| 5,954,382 A | 9/1999 | Combs |
| 5,967,593 A | 10/1999 | Schuler et al. |
| 5,979,970 A | 11/1999 | Rothe et al. |
| 6,019,417 A | 2/2000 | Haberl |
| 6,027,162 A | 2/2000 | Smith |
| 6,033,008 A | 3/2000 | Mattila |
| 6,033,009 A | 3/2000 | Ritter et al. |
| 6,039,383 A | 3/2000 | Jambor et al. |
| 6,042,174 A | 3/2000 | Durrani |
| 6,048,021 A | 4/2000 | Sautter, Jr. |
| 6,053,560 A | 4/2000 | Rothe |
| 6,062,625 A | 5/2000 | Elelnrieder et al. |
| 6,062,637 A | 5/2000 | Hoffmann |
| 6,086,136 A | 7/2000 | Jambor et al. |
| 6,095,590 A | 8/2000 | Matsuda et al. |
| 6,102,456 A | 8/2000 | Boersma |
| 6,131,988 A | 10/2000 | Queveau et al. |
| 6,145,915 A | 11/2000 | Queveau et al. |
| 6,155,614 A | 12/2000 | Lange |
| 6,158,786 A | 12/2000 | Droste et al. |
| 6,168,224 B1 | 1/2001 | Henn et al. |
| 6,182,527 B1 | 2/2001 | Sander |
| 6,213,534 B1 | 4/2001 | MacFarland |
| 6,217,104 B1 | 4/2001 | Neubrand |
| 6,227,604 B1 | 5/2001 | Grace |
| 6,254,165 B1 | 7/2001 | Neubrand |
| 6,257,648 B1 | 7/2001 | Schenk |
| 6,270,144 B1 | 8/2001 | Schenk |
| 6,290,281 B1 | 9/2001 | Durrani et al. |
| 6,293,605 B2 | 9/2001 | Neubrand |
| 6,309,005 B1 | 10/2001 | Priest et al. |
| 6,315,349 B1 | 11/2001 | Kinnanen |
| 6,318,792 B1 | 11/2001 | Neubrand et al. |
| 6,318,793 B1 | 11/2001 | Rapin et al. |
| 6,331,029 B1 | 12/2001 | Schenk |
| 6,336,673 B1 | 1/2002 | Rothe et al. |
| 6,347,828 B1 | 2/2002 | Rapin et al. |
| 6,349,990 B1 | 2/2002 | Park |
| 6,361,086 B1 | 3/2002 | Robbins et al. |
| 6,364,396 B1 | 4/2002 | Hayashi et al. |
| 6,382,701 B1 | 5/2002 | Langguth et al. |
| 6,390,530 B1 | 5/2002 | Maass |
| 6,390,531 B1 | 5/2002 | Schutt |
| 6,390,532 B1 | 5/2002 | MacFarland |
| 6,409,247 B1 | 6/2002 | Maass |
| 6,419,294 B2 | 7/2002 | Neubrand |
| 6,419,308 B1 | 7/2002 | Corder et al. |
| 6,454,344 B2 * | 9/2002 | Okada et al. ............... 296/121 |
| 6,585,310 B1 * | 7/2003 | Guillez et al. .............. 296/121 |
| 6,595,574 B2 | 7/2003 | Shaw et al. |
| 2001/0005090 A1 | 6/2001 | Haberl et al. |
| 2002/0005089 A1 | 1/2002 | Nagata et al. |
| 2002/0014782 A1 | 2/2002 | Neubrand |
| 2003/0034668 A1 | 2/2003 | Quindt |
| 2004/0046416 A1 * | 3/2004 | Heller et al. ................ 296/121 |

* cited by examiner

CONVERTIBLE ROOF SYSTEM

CROSS-REFERENCE TO RELATED APPLICATIONS

This application claims the benefit of U.S. Provisional Application No. 60/403,701, filed on Aug. 15, 2002. The disclosure of the above application is incorporated herein by reference.

BACKGROUND AND SUMMARY OF THE INVENTION

This invention relates generally to automotive roof systems and, more particularly, relates to a latching system for retaining a convertible roof apparatus.

Rigid hardtop convertible roofs have been used on a variety of automotive vehicles. Some of these conventional convertible hardtop roofs are stored in a generally vertical orientation and some are stored in a predominantly horizontal orientation. Furthermore, some of these conventional hardtop roofs fold in a clam-shelling manner while others are collapsible in an overlapping manner. Examples of traditional hardtop convertible roofs are disclosed in the following patents: U.S. Pat. No. 6,347,828 entitled "Actuation Mechanism for a Two Piece Retractable Hardtop Roof for an Automobile" which issued to Rapin et al. on Feb. 19, 2002; U.S. Pat. No. 6,318,793 entitled "Two Piece Retractable Hardtop Roof for an Automobile" which issued to Rapin et al. on Nov. 20, 2001; U.S. Pat. No. 5,979,970 entitled "Roof Assembly for a Convertible Vehicle" which issued to Rothe et al. on Nov. 9, 1999; U.S. Pat. No. 5,785,375 entitled "Retractable Hardtop for an Automotive Vehicle" which issued to Alexander et al. on Jul. 28, 1998; U.S. Pat. No. 5,769,483 entitled "Convertible Motor Vehicle Roof" which issued to Danzl et al. on Jun. 23, 1998; U.S. Pat. No. 5,743,587 entitled "Apparatus for Use in an Automotive Vehicle having a Convertible Roof System" which issued to Alexander et al. on Apr. 28, 1998; and EPO Patent Publication No. 1 092 580 A1 which was published on Apr. 18, 2001. The U.S. patents are incorporated by reference herein.

In accordance with the present invention, a hardtop convertible roof apparatus is provided. In another aspect of the present invention, rigid, hardtop front and/or rear roof sections are employed. A further aspect of the present invention provides a header latch assembly capable of conveniently and reliably latching the front roof section to a front header. In yet another aspect of the present invention, a panel-to-panel latch assembly is provided that selectively couples the front roof section to the rear roof section in response to the latching of the front roof section to the front header.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
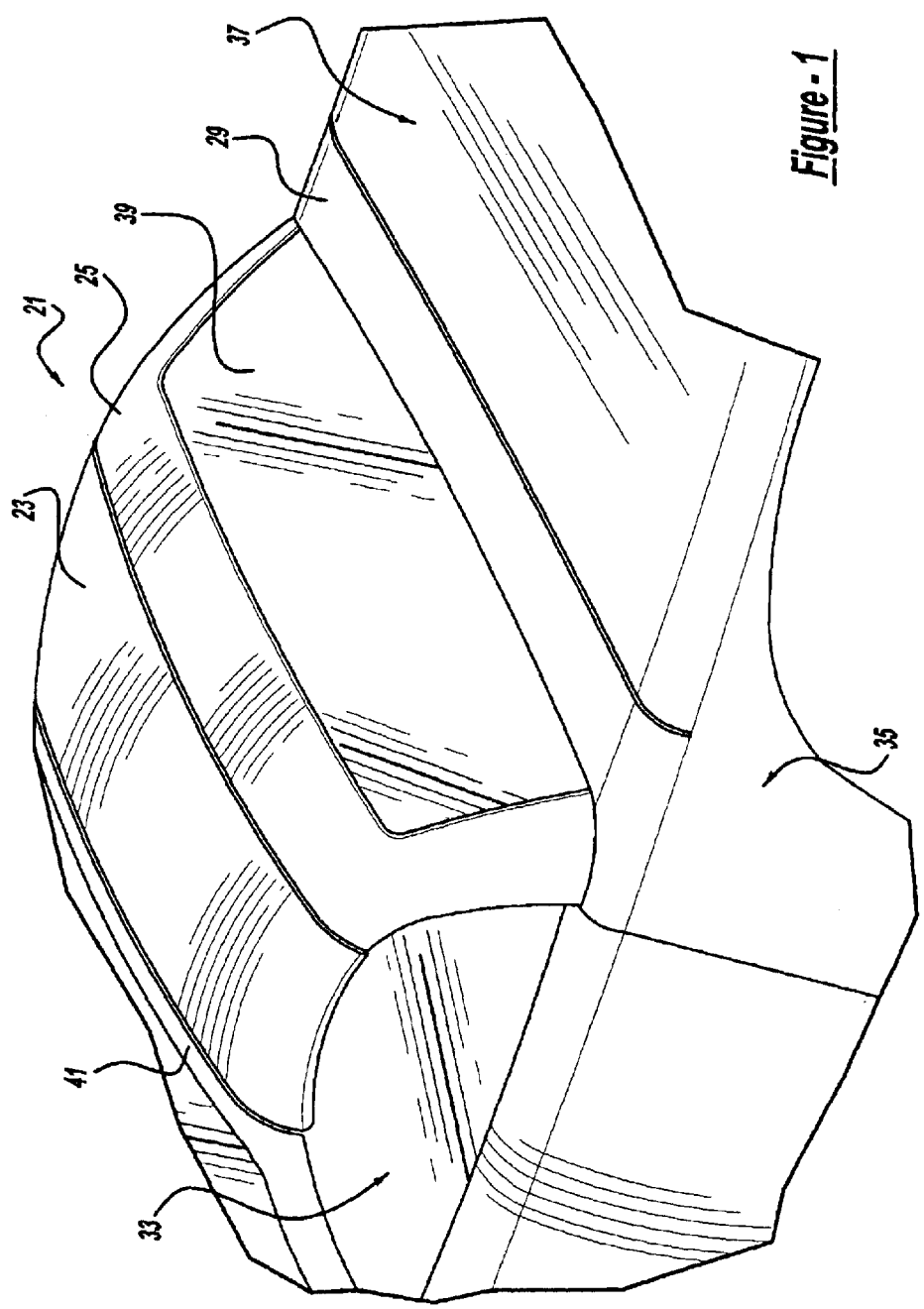
FIG. 1 is a fragmentary, perspective view, as observed from the rear left corner of the vehicle, showing the preferred embodiment of a hardtop convertible roof apparatus of the present invention disposed in a fully closed and raised position.
Figure 2:
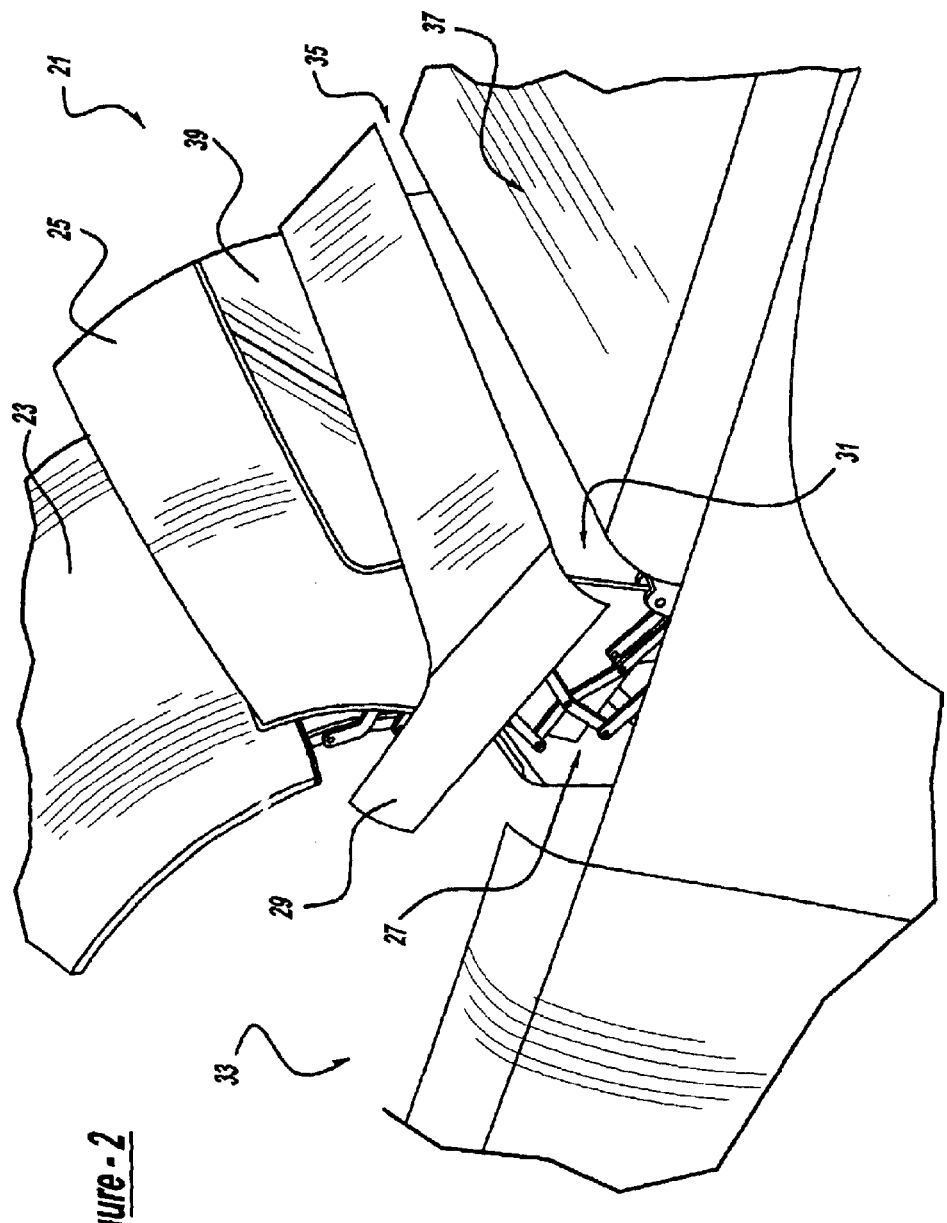
FIG. 2 is a fragmentary and perspective view, like that of FIG. 1, showing the preferred embodiment apparatus disposed in a partially retracted position.
Figure 3:
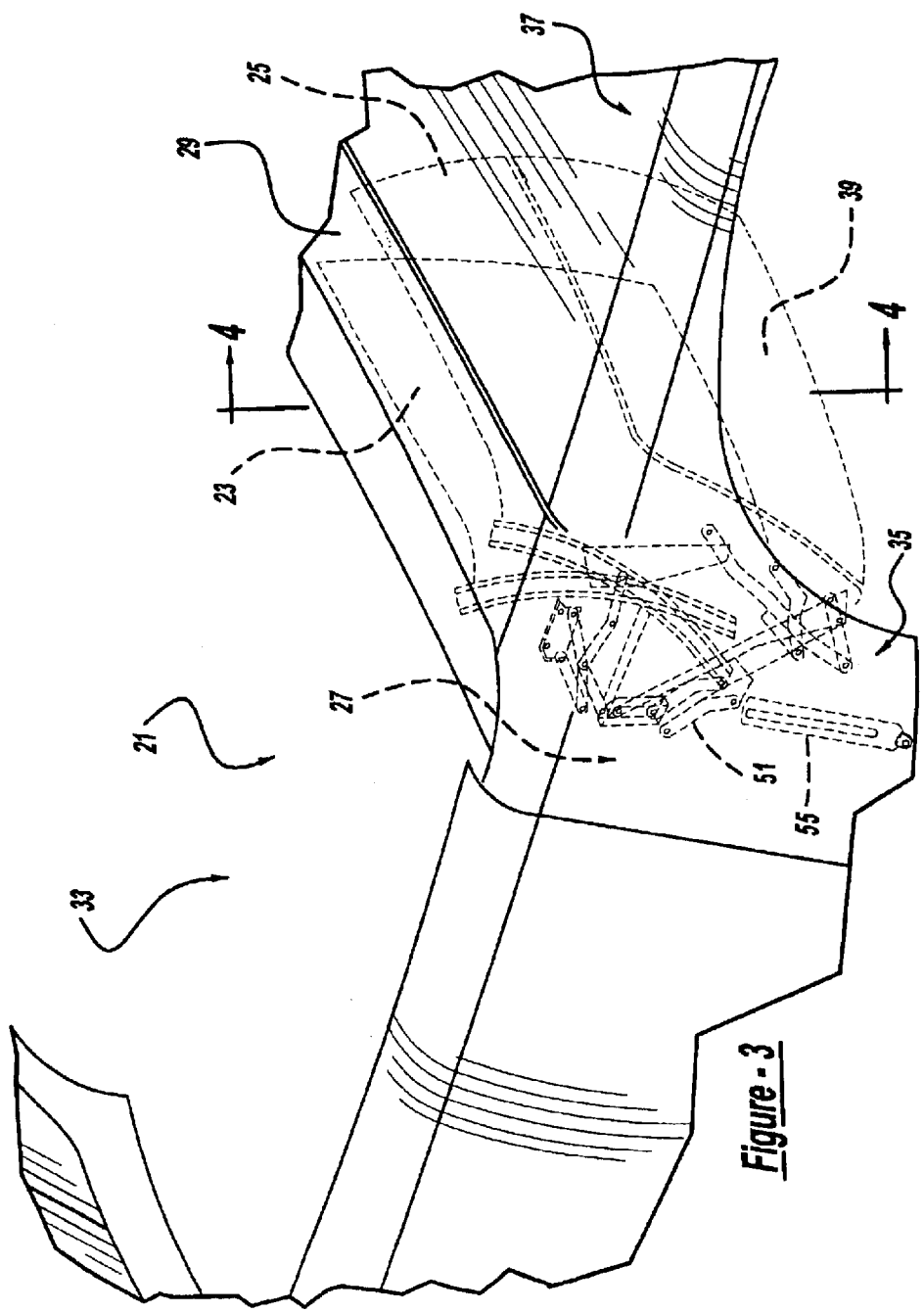
FIG. 3 is a fragmentary and perspective view, like that of FIG. 1, showing the preferred embodiment apparatus disposed in a fully open and retracted position.
Figure 4:
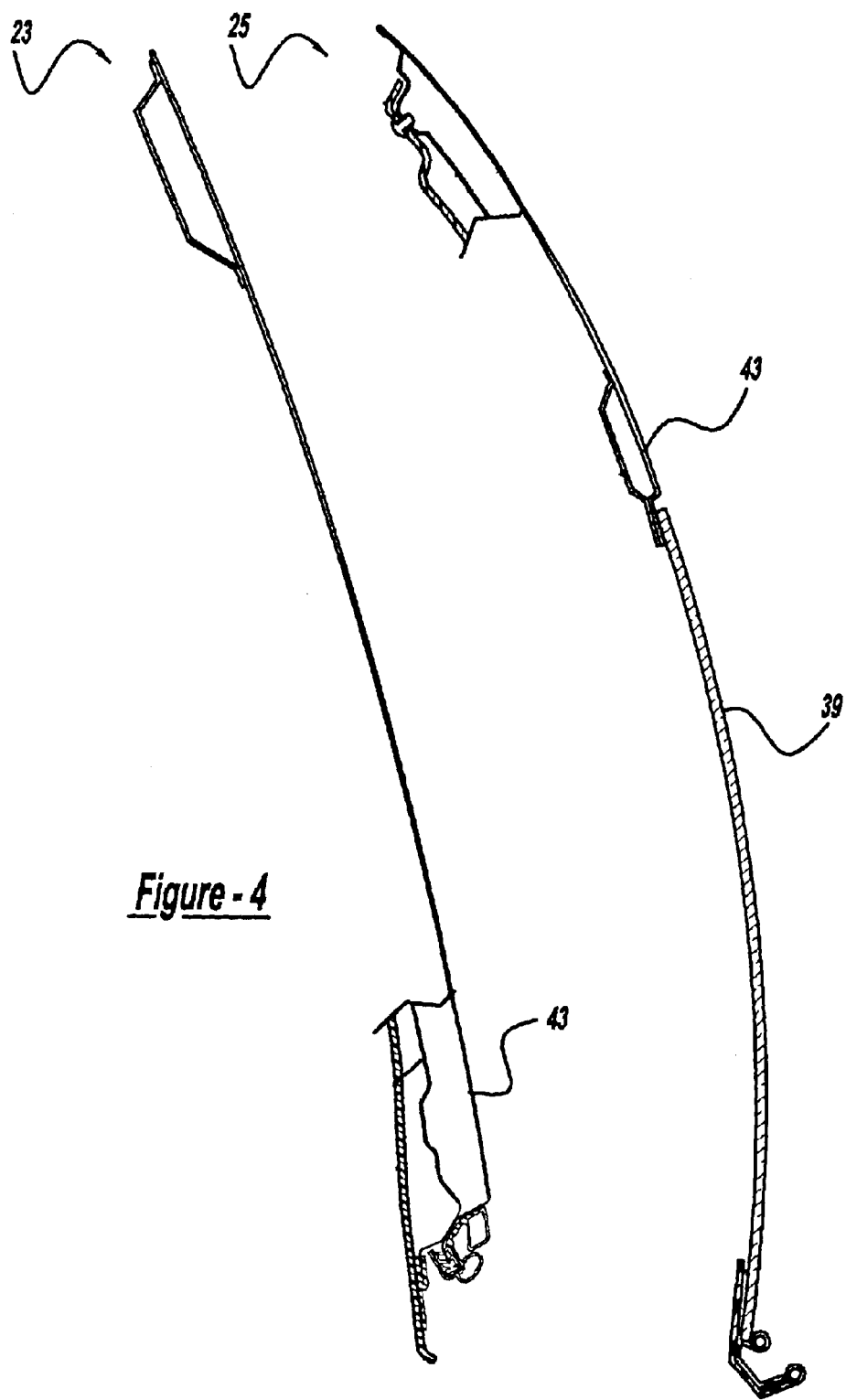
FIG. 4 is a centerline cross sectional view showing the preferred embodiment apparatus, disposed in the fully retracted position.
Figure 5:
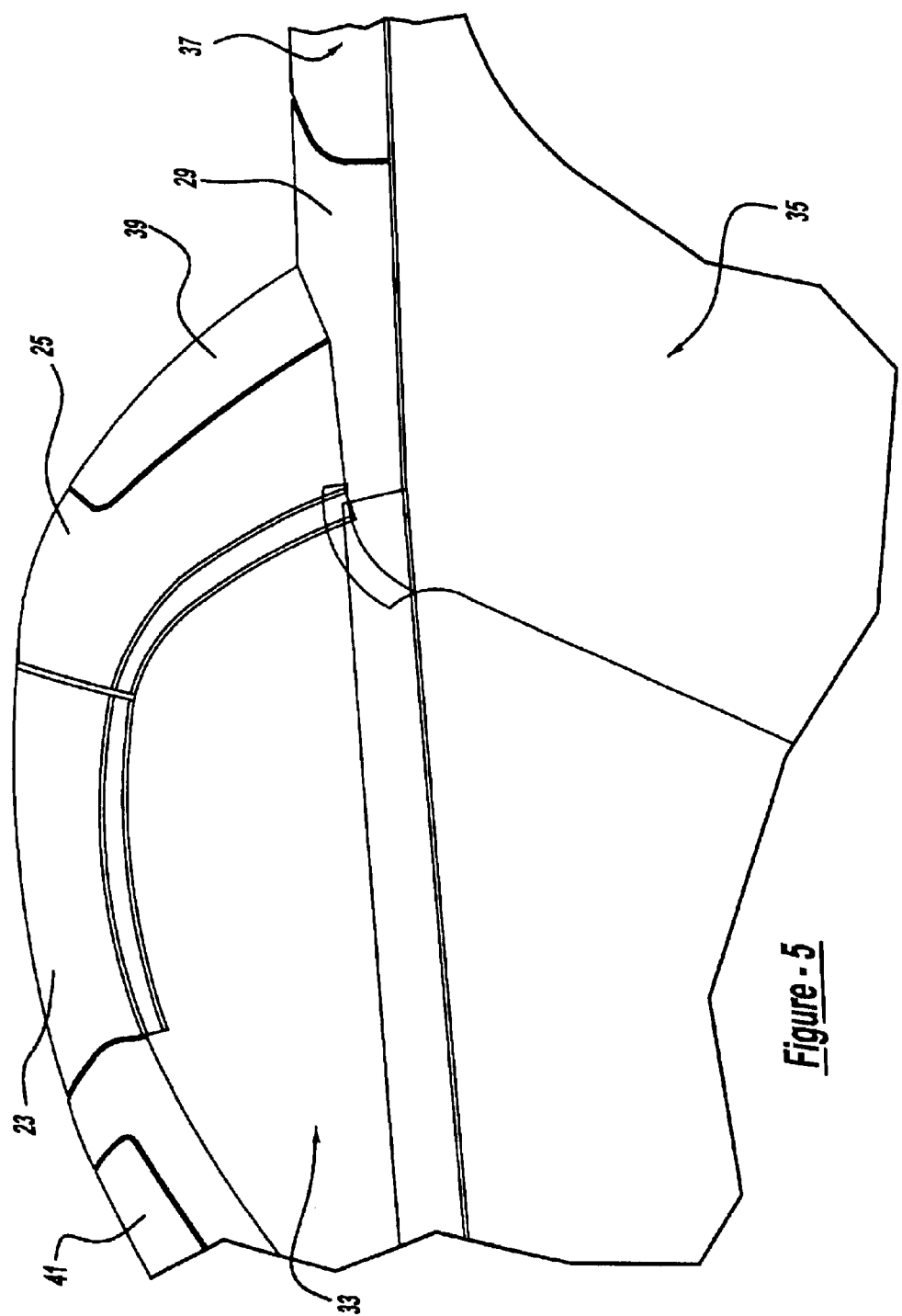
FIG. 5 is a side diagrammatic view showing the preferred embodiment apparatus, disposed in the fully closed position.
Figure 6:
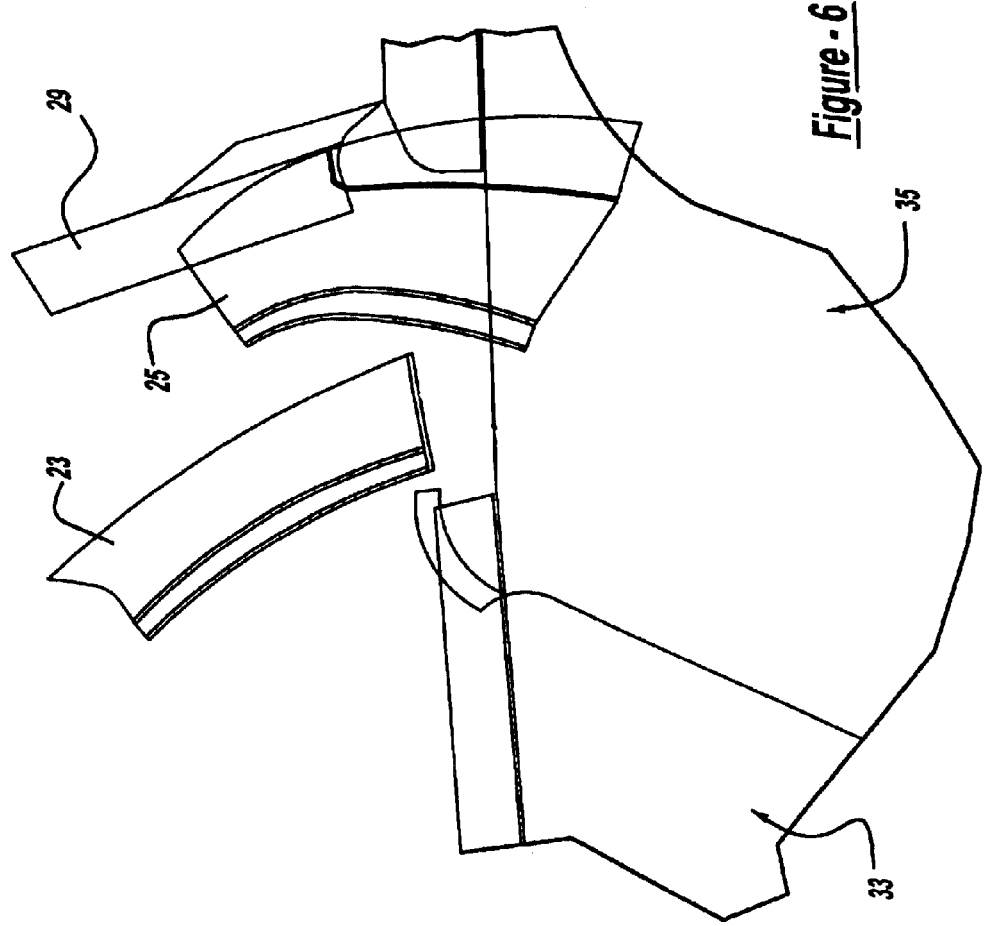
FIG. 6 is a side diagrammatic view showing the preferred embodiment apparatus, disposed in the partially retracted position.
Figure 7:
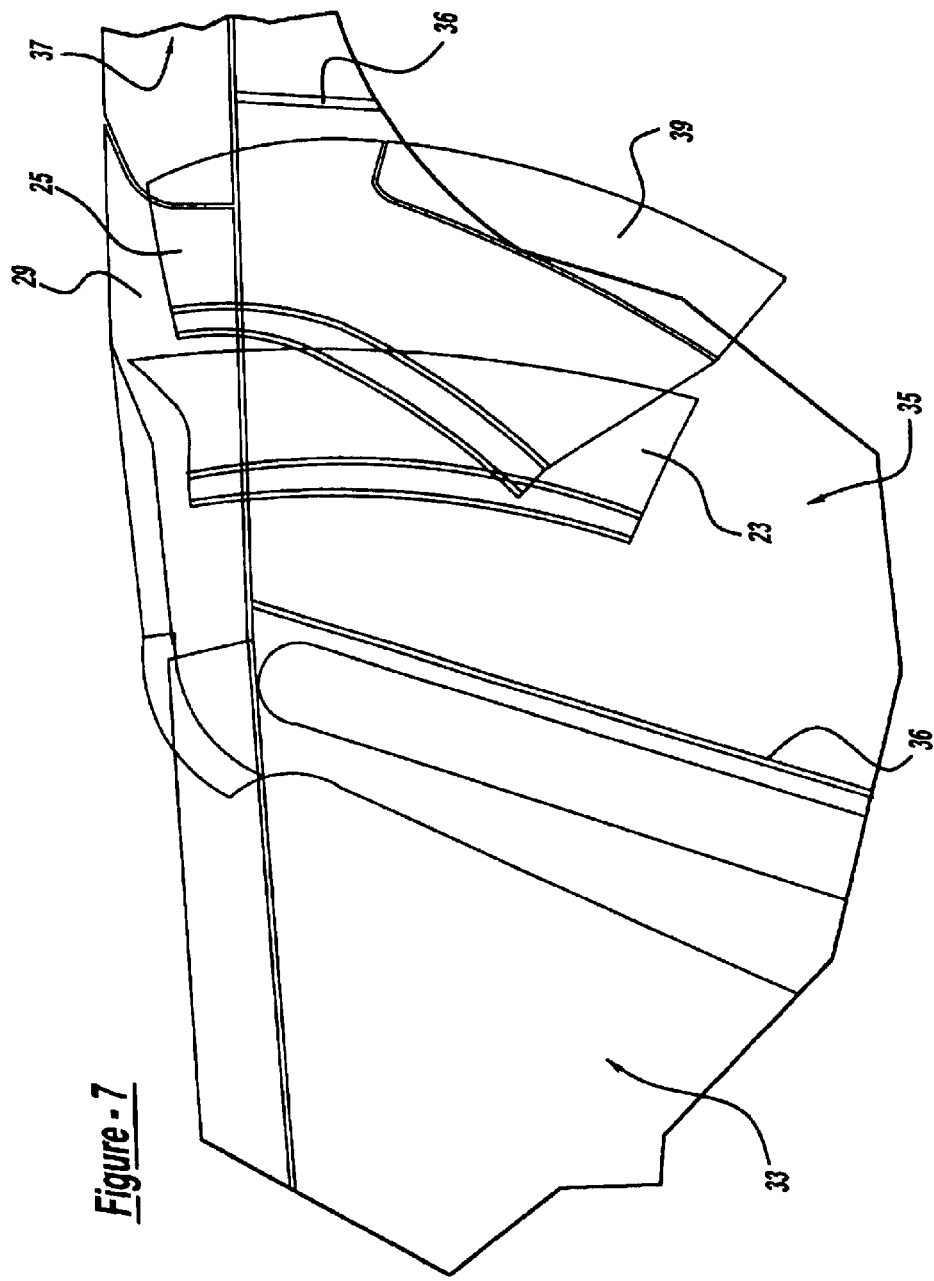
FIG. 7 is a side diagrammatic view showing the preferred embodiment apparatus, disposed in the fully retracted position.

Referring to FIGS. 1–7, a convertible roof system 21 is part of an automotive vehicle and includes a hardtop front roof panel 23, a hardtop rear roof panel 25, a top stack mechanism 27 operable to move the roofs, a rigid tonneau cover 29 and a tonneau cover mechanism 31. Roofs 23 and 25 are automatically movable from fully raised and closed positions covering a passenger compartment 33, as shown in FIGS. 1 and 5, to fully retracted and open positions, as shown in FIGS. 3, 4 and 7, wherein roofs 23 and 25 are stowed in a roof storage area or compartment 35. Roof storage compartment 35 is located between and physically separated by metal panels 36 (see FIG. 7) from passenger compartment 33 and an externally accessible storage area for miscellaneous articles such as a trunk or pickup truck bed 37. A rigid, glass back window or backlite 39 is secured to rear roof panel 25 while front roof panel 23 is disengagably attached to a front header panel 41 by latches (to be discussed below). Roofs 23 and 25 are preferably stamped from steel sheets and include inner reinforcement panels, but the roofs may alternately be formed from polymeric composites or aluminum. Roofs 23 and 25 have opaque outside surfaces 43 that are typically painted. These outside surfaces 43 define three-dimensionally curved planes that are stored in a predominantly vertical and parallel nested orientation when fully retracted and stowed; this can be observed best in FIGS. 4 and 7.

Top stack mechanism 27 is in mirrored symmetry in both outboard sides of the vehicle. Top stack mechanism 27 includes a pair of linkage assemblies 51 and a pair of hydraulic actuators 55. Linkage assembly 51 is preferably constructed in accordance with German patent application serial number 101 39 354.7 entitled "Carbiolet-Fahrzeug" (Vehicle), which was filed on Aug. 17, 2001. Roofs 23 and 25 can be tightly and closely nested together when fully retracted and the centerline, fore-and-aft roof storage area opening can be minimized due to linkage assemblies 51.

Referring now to FIGS. 8–15, convertible roof system 21 further includes a latching system 100 adapted for releasably securing front roof panel 23 to front header panel 41 and, additionally, front roof panel 23 to rear roof panel 25. Latching system 100 generally includes a drive mechanism 102 centrally disposed within front header panel 41, a pair of header latch assemblies 104 disposed along outboard portions of front header panel 41, and a pair of panel-to-panel latch assemblies 106 disposed along the outboard interface of front roof panel 23 and rear roof panel 25. The pair of header latch assemblies 104 and the pair of panel-to-panel latch assemblies 106 are provided in mirrored symmetry and, thus, in interest the brevity, only one header latch assembly and panel-to-panel latch assembly will be discussed in detail herein.

Figure 9:
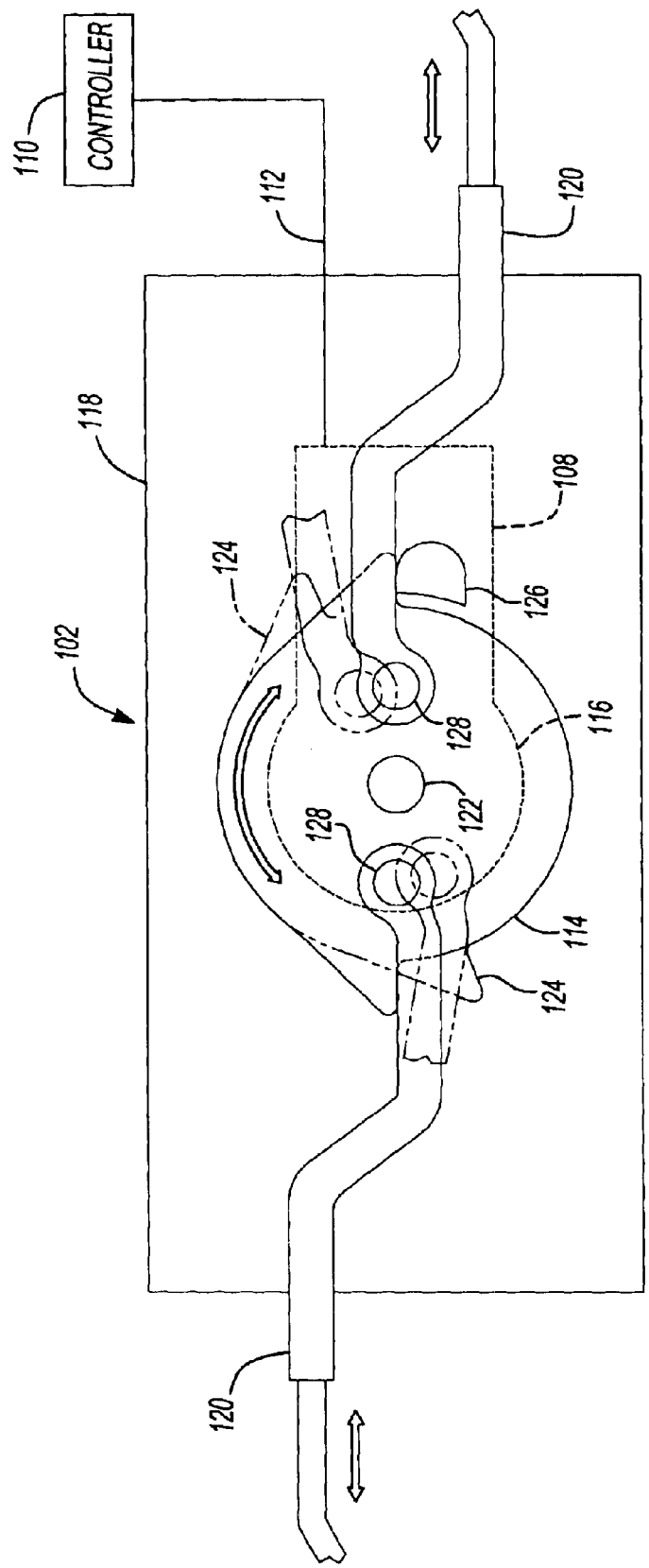
FIG. 9 is a diagrammatic view showing the preferred embodiment drive mechanism.

With particular reference to FIG. 9, drive mechanism 102 is illustrated in accordance with the principles of the present invention. Drive mechanism 102 generally includes a drive motor 108, which is operably coupled to a controller 110 via a line 112. Controller 110 provides a control signal to drive motor 108 to produce a rotary output from drive motor 108 in response to a predetermined condition and/or a user's actuation of a control switch. Drive motor 108 is operably coupled to a drive plate 114 via a gear interface 116. However, it should be appreciated that gear interface 116 may include any one of a number of drive transmission systems, such as a worm gear system, planetary gear system, and the like. Preferably, drive motor 108 is coupled to a housing 118, which is in turn coupled to front header panel 41. Furthermore, drive plate 114 is rotatably coupled on an opposing side of housing 118 to be easily coupled to the header latch drive rods 120. Drive plate 114 is adapted to be rotated about its central axis 122 through a predetermined angular path. To prevent excessive rotation of drive plate 114, drive plate 114 may include at least one stop member 124 extending therefrom that is adapted to engage a corresponding physical stop 126 extending from housing 118.

As indicated above, drive motor 108 and drive plate 114 are adapted to cooperate to drive header latch drive rods 120. To this end, actuation of drive motor 108 by controller 110 produces an oscillating rotating motion in drive plate 114. This oscillating rotating motion is transferred to each of the header latch drive rods 120 through a pivoting connection 128. That is, as drive plate 114 rotates from side to side, this rotating motion is converted into a linear motion through pivoting connection 128 as indicated by the arrows.

Referring now to FIGS. 10–13, header latch assembly 104 will be described in detail. Specifically, header latch assembly 104 generally includes a striker assembly 130 and a retaining assembly 132. Striker assembly 130 generally includes a pair of spaced apart plates 134 and 136. Plates 134 and 136 are generally planar and L-shaped and include a striker member 138 extending therebetween. Header latch assembly 104 further includes a switch actuator 140 extending from a bridge portion 140 formed between plates 134 and 136.

Figure 10:
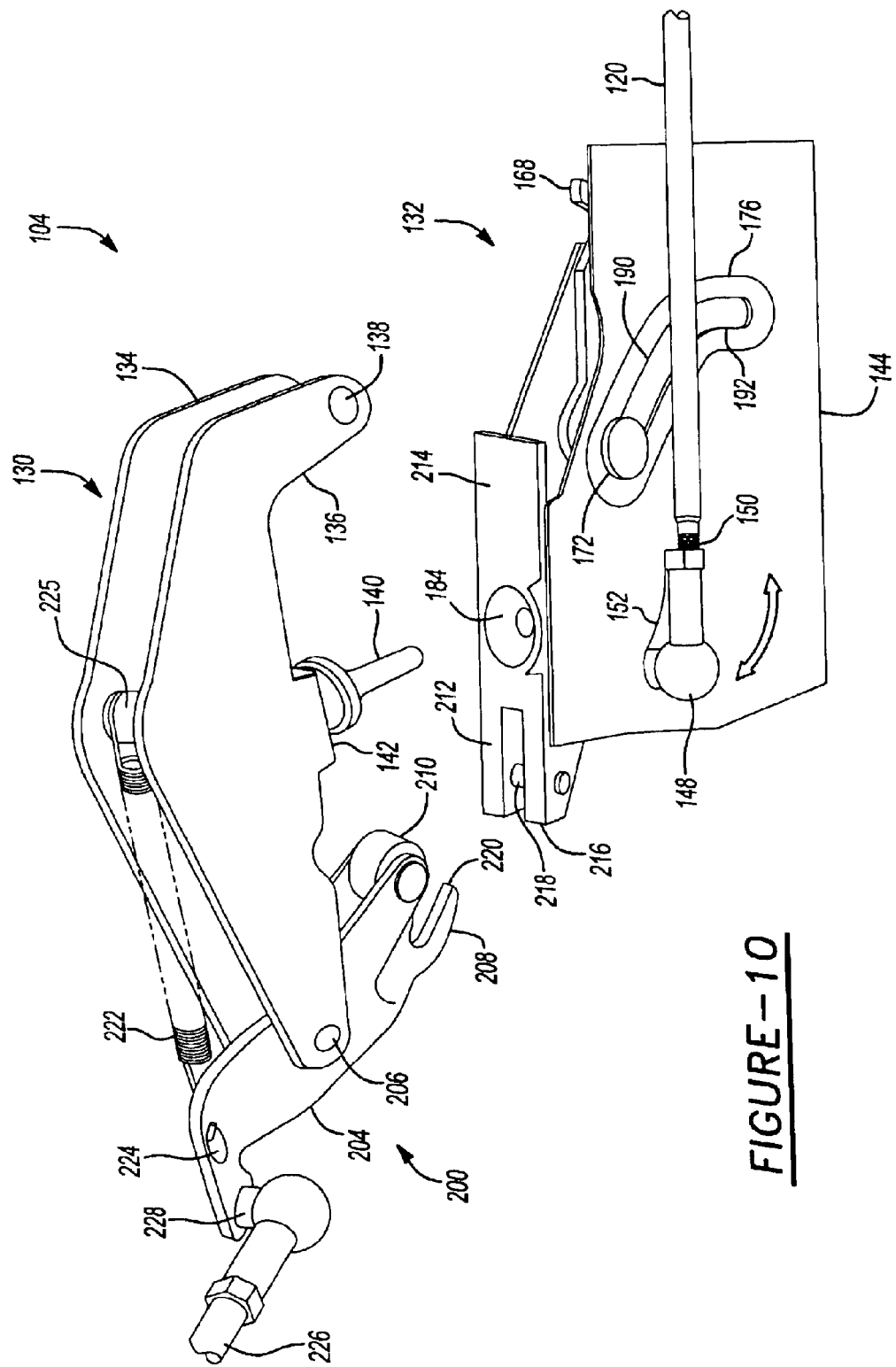
FIG. 10 is a fragmentary and perspective view showing the preferred embodiment apparatus disposed in an unlatched position.

Still referring to FIGS. 10–13, retaining assembly 132 generally includes a mounting housing 144, which is fixedly coupled to front panel header 41 via fasteners extending through mounting holes 146. As best seen in FIG. 10, retaining assembly 130 includes an input stud 148. Input stud 148 is coupled to an end of header latch drive rod 120 through a connector 150. Preferably, input stud 148 is a ball stud that is adjustably coupled to threaded connector 150. Input stud 148 is moved in response to linear motion of header latch drive rod 120 through a path that generally corresponds to arcuate opening 152. Input stud 148 is fixedly coupled to a first linkage 154 at pivot 156. First linkage 154 is further pivotally coupled to mounting housing 144 at opposing pivot 158.

First linkage 154 is still further pivotally coupled to second linkage 160 at pivot 156. An opposing end of second linkage 160 is further pivotally coupled to a midpoint pivot 162 of a third linkage 164. Third linkage 164 is pivotally coupled at one end to mounting housing 144 at pivot 166 and at an opposing end to a retaining member 168 at cam 170.

Cam 170 includes a cam pin 172, a first cam slot 174, and a second cam slot 176. Cam pin 172 is fixedly coupled through an end of retaining member 168. A first end of cam pin 172 cammingly engages first cam slot 174. A second end of cam pin 172 cammingly engages second cam slot 176 formed in housing 144. Second cam slot 176 is generally angular shaped.

Retaining member 168 is generally hook-shaped with a head 178. Retaining member 168 further includes a third cam slot 180 formed in the body thereof. Third cam slot 180 is adapted to cooperate with a second cam pin 182, which is fixedly coupled to mounting housing 144. Head 178 of retaining member 168 is adapted to engage and retain striker member 138 of striker assembly 130 to engage and retaining front roof panel 23 relative to front header panel 41.

Still referring to FIGS. 10–13, switch actuator 140 of striker assembly 130 is adapted to be received within a tapered aperture 184 to actuate a closure switch 186. Closure switch 186 is an electrical switch that is coupled to controller 110 or other logic device via a line 188. Closure switch 186 includes a movable prong 191, which is adapted to rotate in response to contact from switch actuator 140. Tapered aperture 184 is shaped to promote the alignment of switch actuator 140 relative to closure switch 186.

During operation, header latch assembly 104 is actuated to provide a positive and reliable connection between front roof panel 23 and front header panel 41. To this end, controller 110 outputs a control signal to drive motor 108 in response to actuation of an interior occupant switch and/or closure switch 186. Drive motor 108 thus drives gear interface 116 to rotate drive plate to 114. Rotation of drive plate 114 pivots header latch drive rods 120 to produce a linear movement along header latch drive rod 120. During a locking operation, header latch drive rods 120 produce a pulling force at the end thereof. Accordingly, during an unlocking operation, header latch drive rods 120 produce a pushing force at the end thereof.

Figures 11, 12, 13:
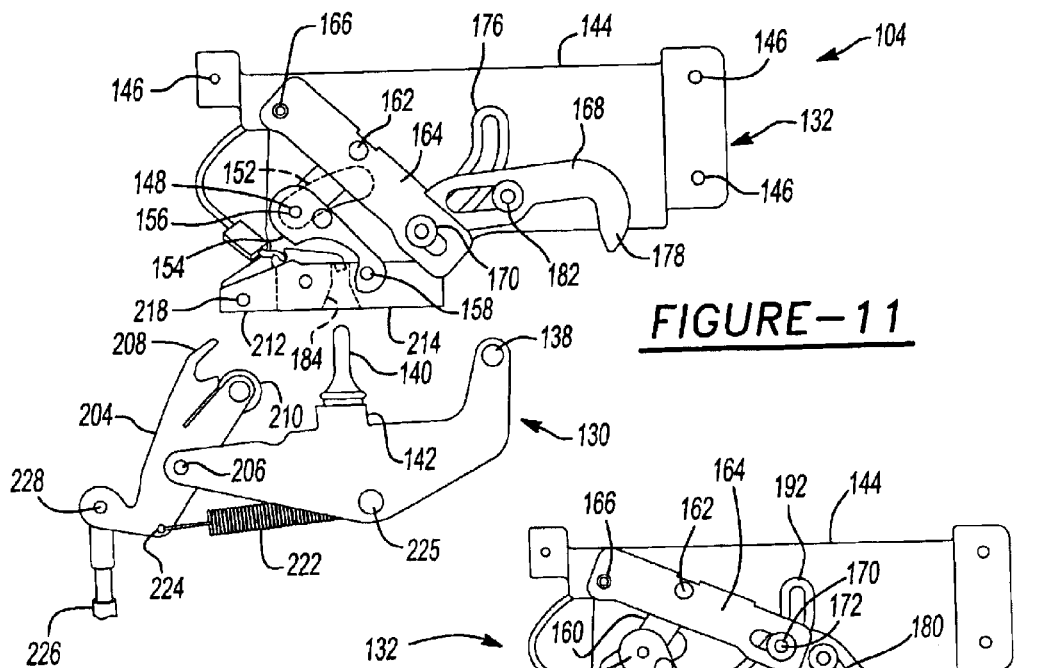
FIG. 11 is a diagrammatic view showing the preferred embodiment apparatus disposed in an unlatched position.
FIG. 12 is a diagrammatic view showing the preferred embodiment apparatus disposed in an intermediate position.
FIG. 13 is a diagrammatic view showing the preferred embodiment apparatus disposed in a latched position.

This pulling force then translates to input stud 148 via header latch drive rod 120, thereby pulling input stud 148 toward an inboard position of the vehicle, indicated by arrow A (FIG. 10). As best seen in FIGS. 11–13, this inboard movement of input stud 148 rotates first linkage 154 clockwise about pivot 158, thereby driving second linkage 160. Second linkage 160 in turn drives third linkage 164 about pivot 166. This rotation of third linkage 164 about pivot 166 causes cam pin 172 of retaining member 168 to cam within first slot 174. Simultaneously, cam pin 172 further cams within second slot 176. As should be appreciated from FIGS. 11–13, second slot 176 generally includes a first arcuate section 190 and a second arcuate section 192. Movement of cam pin 172 and thus retaining member 168 through first arcuate section 190 of second slot 176 causes retaining member 168 to rotate in a generally circular direction as seen in FIGS. 11 and 12. However, movement of cam pin 172 through second arcuate section 192 of second slot 176 causes retaining member 168 to now moved in a generally linear direction as seen in FIG. 13. This final linear movement aids in pulling front roof panel 23 straight toward front header panel 41 to affect a reliable seal therebetween. Following this final linear movement, front roof panel 23 is now fixedly and reliably secured to front header panel 41. Unlocking of header latch assembly 104 is achieved through a reverse operation.

Referring now to FIGS. 8 and 10–15, panel-to-panel latch assembly 106 is described in detail. Panel-to-panel latch assembly 106 generally includes a roller assembly 200 and a hook assembly 202. As best seen in FIGS. 10–13, roller assembly 200 generally includes a crank 204 that is pivotally coupled between plates 134 and 136 of striker assembly 130 at pivot 206. Crank 204 includes a bifurcated end portion 208 and a roller portion 210. During closure of convertible roof system 21, roller portion 210 is adapted to engage a roller surface 212 formed along a face surface 214 of mounting housing 144. That is, roller surface 212 generally provides a flat and uniform surface upon which roller portion 210 can roll (see FIGS. 12 and 13). Additionally, bifurcated end portion 208 is preferably sized to fit within a corresponding bifurcated end 216 of roller surface 212. Bifurcated end portion 208 is adapted to engage a pin 218, which extends between bifurcated ends 216. More particularly, bifurcated end portion 208 includes an elongated finger 220, which extends along one side of pin 218. During an unlocking operation, elongated finger 220 engage pin 208 and ensures that crank 204 begins rotating in a counterclockwise direction as viewed in FIGS. 11–13.

Roller assembly 200 further includes an extension spring 222 extending between in aperture 224 formed in crank 204 and a mounting post 225. Mounting post 227 is fixedly coupled between plates 134 and 136. Extension spring 222 biases crank 204 in a counterclockwise direction as seen in FIGS. 11–13.

Figure 8:
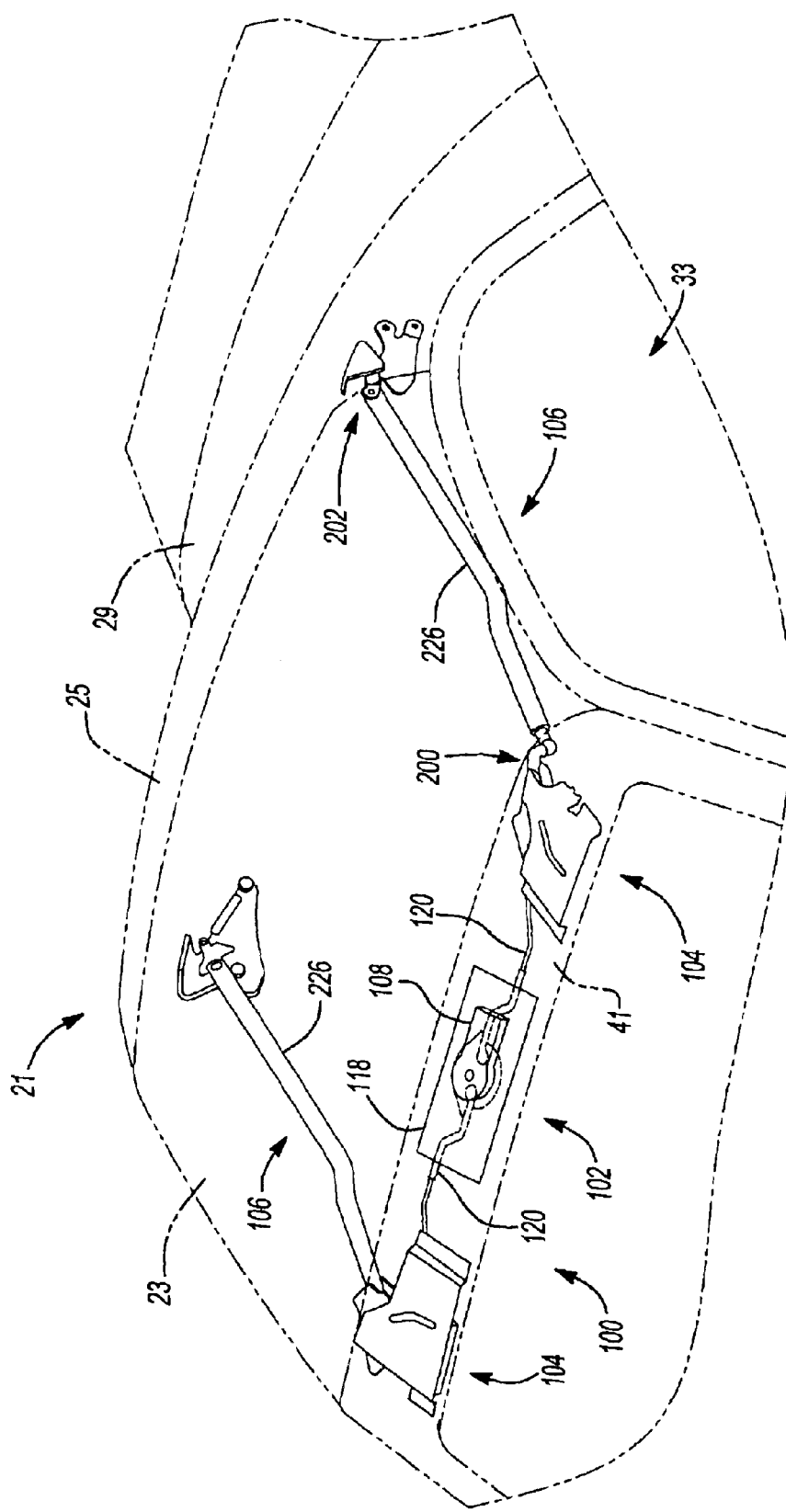
FIG. 8 is a fragmentary, perspective view, as observed from the front left corner of the vehicle, showing the preferred embodiment of a hardtop convertible roof apparatus of the present invention disposed in a fully closed and raised position.
Figure 14:
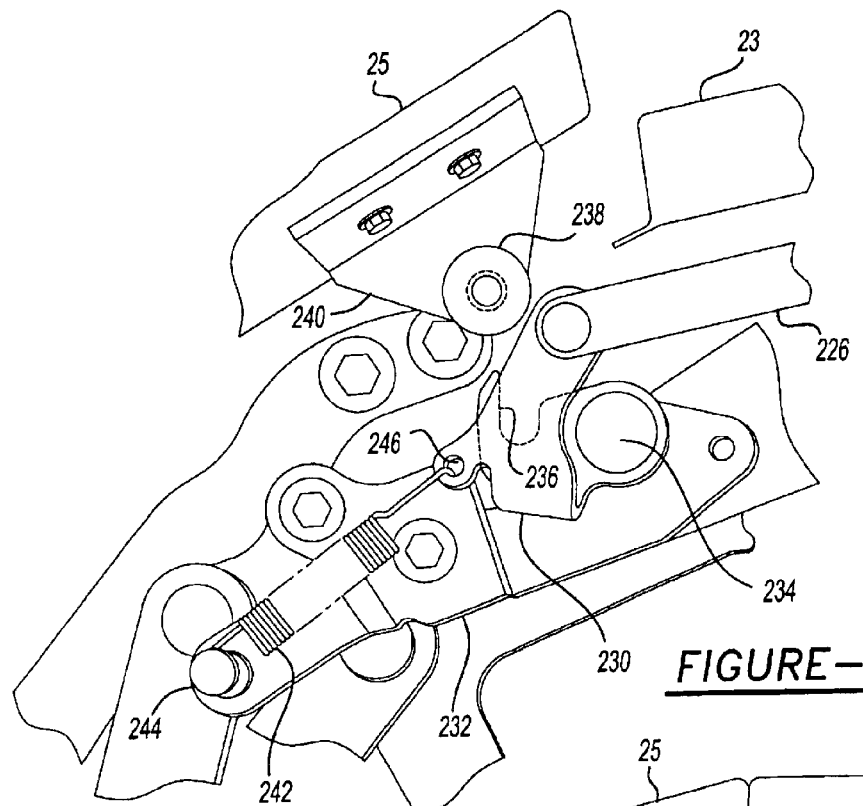
FIG. 14 is a diagrammatic view showing the preferred embodiment apparatus disposed in an unlatched position.
Figure 15:
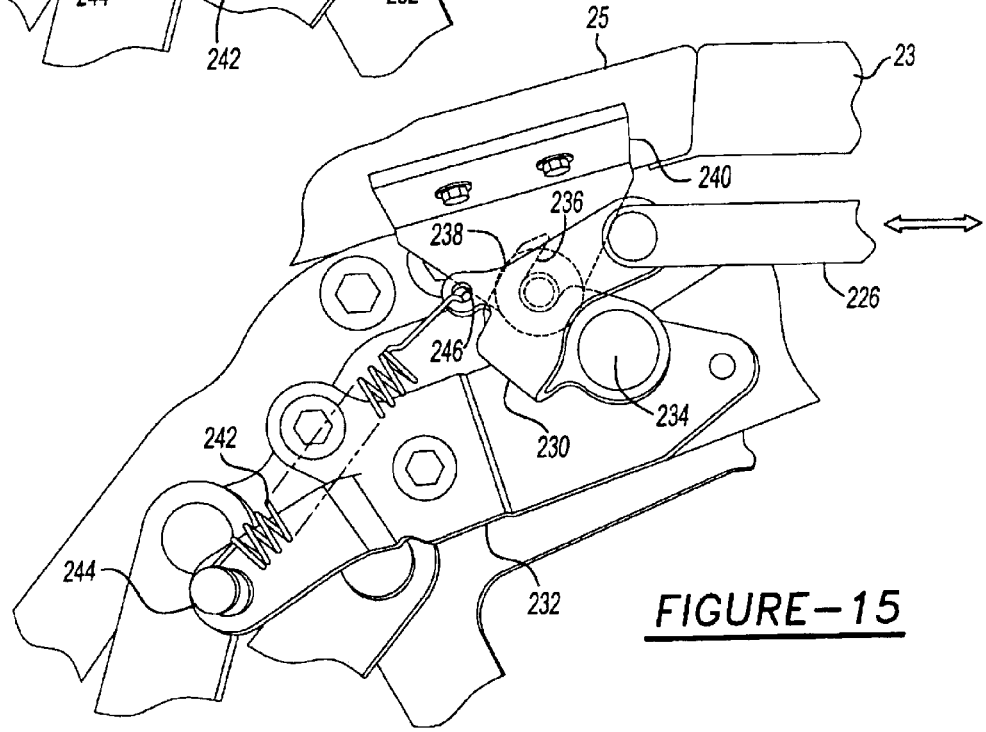
FIG. 15 is a diagrammatic view showing the preferred embodiment apparatus disposed in a latched position.

Crank 204 is pivotally coupled to a panel-to-panel latch drive rod 226 at pivot 228. As best seen in FIGS. 8, 14, and 15, panel-to-panel latch drive rod 226 is further pivotally coupled to a latch member 230 of hook assembly 202. A latch member 230 is pivotally mounted to a bracket 232 at pivot 234, which is fixed to front roof panel 23. Latch member 230 is generally U-shaped such that one leg of the U supports the pivot connection between panel-to-panel latch drive rod 226 and latch member 230. The other leg of the U supports pivot 234 and a hook portion 236.

Hook portion 236 of latch member 230 is adapted to engage a connector 238 to define a locking engagement. Connector 238 is preferably a V-shaped connector when viewed in cross-section. Connector 238 is mounted to a bracket 240, which is fixed to rear roof panel 25.

Hook assembly 202 further includes an extension spring 242, which extends between a mounting post 244 extending from bracket 232 and an aperture 246 formed in latch member 230. Extension spring 242 biases latch member 230 in a counterclockwise direction as seen in FIGS. 14 and 15. Accordingly, extension spring 242 cooperates with extension spring 222 to bias panel-to-panel latch assembly 106 into an unlatched position.

During operation, panel-to-panel latch assembly 106 is actuated to provide a positive and reliable connection between front roof panel 23 and to rear roof panel 25. It should be appreciated that the latching and unlatching of panel-to-panel latch assembly 106 is dependent upon the engagement of front roof panel 23 with front header panel 41. More particularly, as top stack mechanism 27 drives front roof panel 23 toward front header panel 41, roller 210 engages roller surface 212 on face surface 214. Further actuation of front roof panel 23 toward front header panel 41 causes roller 210 to roll along roller surface 212, thereby pivoting crank 204 in a clockwise direction about pivot 206 and against the biasing force of extension spring 222, as seen in FIGS. 11–13. Such rotation of crank 204 about pivot 206 causes a forward linear movement of panel-to-panel latch drive rod 226.

As best seen in FIGS. 14 and 15, as top stack mechanism 27 further drives front roof panel 23 and rear roof panel 25 to a closed position, connector 238 travels to a position generally adjacent latch member 230. The forward linear movement of panel-to-panel latch drive rod 226 pulls upon latch member 230 to rotate latch member 230 about pivot 234 against the biasing force of extension spring 242. This rotation of latch member 230 causes hook portion 236 to engage connector 238, thereby fixedly coupling front roof panel 23 and rear roof panel 25.

Although unlocking of panel-to-panel latch assembly 106 is achieved through a reverse operation, it is important to note that finger 220 of crank 204 is adapted to engage pin 218 to ensure that crank 204 is forced to rotated immediately into a counterclockwise direction, while extension springs 222 and 242 further encourage this motion, so as to ensure the proper unlatching of roller assembly 202.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A convertible roof system for an automobile, said convertible roof system comprising:
    a first hardtop roof panel movable between a closed position and an opened position;
    at least a second hardtop roof panel movable between a closed position and an opened position; and
    a latching system operable to directly couple said first hardtop roof panel and said second hardtop roof panel together in response to movement of said first hardtop roof panel from said opened position to said closed position.

2. The convertible roof system according to claim 1 wherein said latching system comprises:
    a connector coupled to said second hardtop roof panel; and
    a latch member pivotally coupled to said first hardtop roof panel, said latch member being moveable to engage said connector thereby directly coupling said first hardtop roof panel and said second hardtop roof panel.

3. The convertible roof system according to claim 2, further comprising:
   a crank member operable to move between a first position and a second position when said first hardtop roof panel is moved into said closed position; and
   a drive member operably coupled with said crank member and said latch member such that as said crank member moves from said first position to said second position, said drive member drives said latch member into engagement with said connector thereby directly coupling said first hardtop roof panel and said second hardtop roof panel.

4. The convertible roof system according to claim 3 wherein said crank member includes a roller member coupled thereto, said roller member engageable with a roller surface of a header of the automobile to cause said crank member to move from said first position to said second position as first hardtop roof panel is positioned in said closed position.

5. The convertible roof system according to claim 2 wherein said latch member is biased in a disengaged position from said connector.

6. The convertible roof system according to claim 2 wherein said latch member includes a hook portion engageable with said connector.

7. A convertible roof system for an automobile, said convertible roof system comprising:
   a first hardtop roof panel movable between a closed position and an opened position;
   an actuator device mountable on the fixed body structure;
   a fixed member on the automobile;
   a drive rod operably coupled to said actuator device, said drive rod being driven in response to movement of said actuator device;
   a first linkage pivotally coupled to said drive rod and said fixed member, said first linkage being moveable with said drive rod;
   a second linkage pivotally coupled to said first linkage;
   a third linkage pivotally coupled to said fixed member and said second linkage, said third linkage being moveable in response to said second linkage; and
   a retaining member pivotally coupled to said third linkage, said retaining member further being pivotally coupled to said fixed member through a lost motion coupling, said retaining member being engageable with a striker assembly formed on said first hardtop roof panel to retain said first hardtop roof panel in said closed position.

8. The convertible roof system according to claim 7, further comprising:
   a second hardtop roof panel movable between a closed position and an opened position; and
   a latching system operable to directly couple said first hardtop roof panel and said second hardtop roof panel together in response to movement of said first hardtop roof panel from said opened position to said closed position.

9. The convertible roof system according to claim 8 wherein said latching system comprises:
   a connector coupled to said second hardtop roof panel; and
   a latch member pivotally coupled to said first hardtop roof panel, said latch member being moveable to engage said connector thereby directly coupling said first hardtop roof panel and said second hardtop roof panel.

10. The convertible roof system according to claim 9, further comprising:
    a crank member pivotally coupled to said striker assembly, said crank member being operable to move between a first position and a second position as said crank member contacts said fixed member; and
    a drive member operably coupled with said crank member and said latch member such that as said crank member moves from said first position to said second position, said drive member drives said latch member into engagement with said connector.

11. The convertible roof system according to claim 10 wherein said crank member includes a roller member coupled thereto, said roller member engageable with a roller surface on said fixed member to cause said crank member to move from said first position to said second position as first hardtop roof panel is positioned in said closed position.

12. The convertible roof system according to claim 9 wherein said latch member is biased in a second position disengaged from said connector.

13. The convertible roof system according to claim 7 wherein said retaining member being pivotally coupled to said third linkage includes a cam pin extending from said retaining member, said cam pin operably engaging a first slot formed in said third linkage and a second slot formed in said fixed member.

14. The convertible roof system according to claim 13 wherein said second slot is generally angular shaped.

15. The convertible roof system according to claim 13 wherein said latch member includes a hook portion engageable with said connector.

16. The convertible roof system according to claim 7 wherein said actuator device is a motorized actuator.

17. The convertible roof system according to claim 7, further comprising:
    a pin member formed on said striker assembly; and
    a switch member mounted on said fixed member, said switch member being operable to output a signal when said pin member engages said switch member once said first hardtop roof panel is in said closed position.

18. A convertible roof system for an automobile, said convertible roof system comprising:
    a first hardtop roof panel movable between a closed position and an opened position;
    a second hardtop roof panel movable between a closed position and an opened position;
    a fixed member mountable to the automobile;
    a connector coupled to said second hardtop roof panel;
    a latch member pivotally coupled to said first hardtop roof panel, said latch member being moveable to engage said connector thereby directly coupling said first hardtop roof panel and said second hardtop roof panel;
    a crank member pivotally coupled to said first hardtop roof panel, said crank member being operable to move between a first position and a second position when said first hardtop roof panel contacts the fixed member; and
    a drive member operably coupled with said crank member and said latch member such that as said crank member moves from said first position to said second position, said drive member drives said latch member into engagement with said connector thereby directly coupling said first hardtop roof panel and said second hardtop roof panel.

19. The convertible roof system according to claim 18 wherein said crank member includes a roller member coupled thereto, said roller member engageable with a roller surface on the fixed member to cause said crank member to move from said first position to said second position as first hardtop roof panel is positioned in said closed position.

20. The convertible roof system according to claim 18 wherein said latch member is biased in a disengaged position from said connector.

21. The convertible roof system according to claim 18 wherein said latch member includes a hook portion engageable with said connector.

22. The convertible roof system according to claim 18, further comprising:

an actuator device mounted on said fixed member;

a drive rod operably coupled to said actuator device, said drive rod being driven in response to movement of said actuator device;

a first linkage pivotally coupled to said drive rod and said fixed member, said first linkage being moveable with said drive rod;

a second linkage pivotally coupled to said first linkage;

a third linkage pivotally coupled to said fixed member and said second linkage, said third linkage being moveable in response to said second linkage; and a retaining member pivotally coupled to said third linkage, said retaining member further being pivotally coupled to said fixed member through a lost motion cam slot, said retaining member being engageable with a striker assembly formed on said first hardtop roof panel to retain said first hardtop roof panel in said closed position.

23. A method of actuating a convertible roof system of an automotive vehicle, said convertible roof system having a first hardtop roof panel having a crank member pivotally coupled thereto, a second hardtop roof panel, a top stack mechanism supporting the first and second hardtop roof panels, and a latching system for coupling the first hardtop roof panel to the second hardtop roof panel, said crank member being pivotally coupled to the latching system, said method comprising:

actuating said top stack mechanism to move said first hardtop roof panel and said second hardtop roof panel to a closed position such that said crank member pivots in response to contact of said crank member with a header support of the automotive vehicle;

driving said latching system by said pivoting of said crank member; and coupling said first hardtop roof panel and said second hardtop roof panel together.

24. A method of actuating a convertible roof system of an automotive vehicle, said convertible roof system having a first hardtop roof panel, a striker assembly coupled to said first hardtop roof panel, and a fixed member coupled to the automotive vehicle, said method comprising:

driving an actuator device coupled to a drive rod, said drive rod driving a first linkage pivotally coupled to said fixed member, said first linkage driving a second linkage, said second linkage driving a third linkage, said third linkage driving a retaining member via a lost motion cam assembly; and engaging and retaining said striker assembly of said first hardtop roof panel with said retaining member.

25. The method according to claim 24 further comprising:

providing a second hardtop roof panel;

providing a latching system having a crank member pivotally coupled to said striker assembly, a connector coupled to said second hardtop roof panel, a latch member pivotally coupled to said first hardtop roof panel, and a drive member interconnecting said crank member and said latch member; and pivoting said crank member in response to said step of engaging and retaining said striker assembly of said first hardtop roof panel with said retaining member;

driving said drive member by said pivoting of said crank member;

coupling said latch member with said connector to retain said first hardtop roof panel with said second hardtop roof panel.

26. The method according to claim 24, further comprising: biasing said latch member disengaged from said connector.

* * * * *

UNITED STATES PATENT AND TRADEMARK OFFICE
CERTIFICATE OF CORRECTION

PATENT NO. : 6,837,535 B2
DATED : January 4, 2005
INVENTOR(S) : Frank Plesternings It is certified that error appears in the above-identified patent and that said Letters Patent is hereby corrected as shown below:

<u>Column 4,</u>
Line 7, "bridge portion 140" should be -- bridge portion 142 --.
Line 42, "retaining" should be -- retain --.
Line 59, (second occurrence), after "plate" delete "to".

<u>Column 5,</u>
Line 17, "moved" should be -- move --.
Line 48, (first occurrence), "in" should be -- and --.

<u>Column 6,</u>
Line 38, "rotated" should be -- rotate --.

Signed and Sealed this

Twelfth Day of April, 2005

JON W. DUDAS
*Director of the United States Patent and Trademark Office*